US010678996B1

(12) United States Patent
Martignoni

(10) Patent No.: US 10,678,996 B1
(45) Date of Patent: Jun. 9, 2020

(54) UNSTRUCTURED FOOTNOTES IN ELECTRONIC MORTGAGE DOCUMENTS

(71) Applicant: QuantumReverse Inc., Raleigh, NC (US)

(72) Inventor: Thomas M. Martignoni, Raleigh, NC (US)

(73) Assignee: QuantumReverse, Inc., Raleigh, NC (US)

(*) Notice: Subject to any disclaimer, the term of this patent is extended or adjusted under 35 U.S.C. 154(b) by 0 days.

(21) Appl. No.: 16/296,294

(22) Filed: Mar. 8, 2019

Related U.S. Application Data

(60) Provisional application No. 62/771,620, filed on Nov. 27, 2018.

(51) Int. Cl.
| | |
|---|---|
| *G06F 40/00* | (2020.01) |
| *G06F 40/169* | (2020.01) |
| *G06F 16/93* | (2019.01) |
| *G06Q 40/02* | (2012.01) |
| *G06F 16/955* | (2019.01) |
| *G06F 40/174* | (2020.01) |

(52) U.S. Cl.
CPC ............ *G06F 40/169* (2020.01); *G06F 16/93* (2019.01); *G06F 16/9558* (2019.01); *G06F 40/174* (2020.01); *G06Q 40/02* (2013.01)

(58) Field of Classification Search
CPC .................................................. G06F 40/134
See application file for complete search history.

(56) References Cited

U.S. PATENT DOCUMENTS

| | | | | |
|---|---|---|---|---|
| 4,982,344 A | * | 1/1991 | Jordan | G06F 16/94 715/804 |
| 5,603,025 A | * | 2/1997 | Tabb | G06F 16/94 |
| 5,991,745 A | | 11/1999 | Kiritz | |
| 6,076,072 A | * | 6/2000 | Libman | G06Q 10/10 206/232 |
| 7,493,560 B1 | * | 2/2009 | Kipnes | G06F 9/453 715/729 |
| 7,711,619 B2 | | 5/2010 | Merton | |
| 8,346,657 B1 | | 1/2013 | Hopkins, III | |
| 9,514,113 B1 | * | 12/2016 | Shaw | G06F 16/9558 |

(Continued)

OTHER PUBLICATIONS

Bry et al., "Advanced Modeling and Browsing of Technical Documents," SAC 2002, copyright 2002 ACM, p. 520-524. (Year: 2002).*

*Primary Examiner* — Amelia L Tapp
(74) *Attorney, Agent, or Firm* — Scott P. Zimmerman, PLLC

(57) ABSTRACT

Unstructured explanatory information is added to an electronic mortgage form and other borrower/applicant documentation. When a user wishes to document or explain any entry or data, the user may add and insert an explanatory footnote into the electronic mortgage form and other borrower/applicant documentation. The user may enter a keyboard command or other instruction for locating and formatting the footnote. The user enters/types the text of the footnote, which may also include or specify an HTML tag that references a document attachment. When the electronic mortgage form is then generated, the electronic mortgage form incorporates the explanatory footnote. However, the HTML tag is replaced with a more human-understandable attachment name.

20 Claims, 6 Drawing Sheets

(56) References Cited

U.S. PATENT DOCUMENTS

| | | | | |
|---|---|---|---|---|
| 9,779,063 B1* | 10/2017 | Dykema | ............. | G06F 16/5854 |
| 10,423,703 B1* | 9/2019 | Singh | .................... | G06F 40/134 |
| 2003/0145281 A1* | 7/2003 | Thames | .................... | G06F 8/71 |
| | | | | 715/205 |
| 2010/0121888 A1* | 5/2010 | Cutting | ................ | G06F 16/248 |
| | | | | 707/803 |

* cited by examiner

FIG. 5

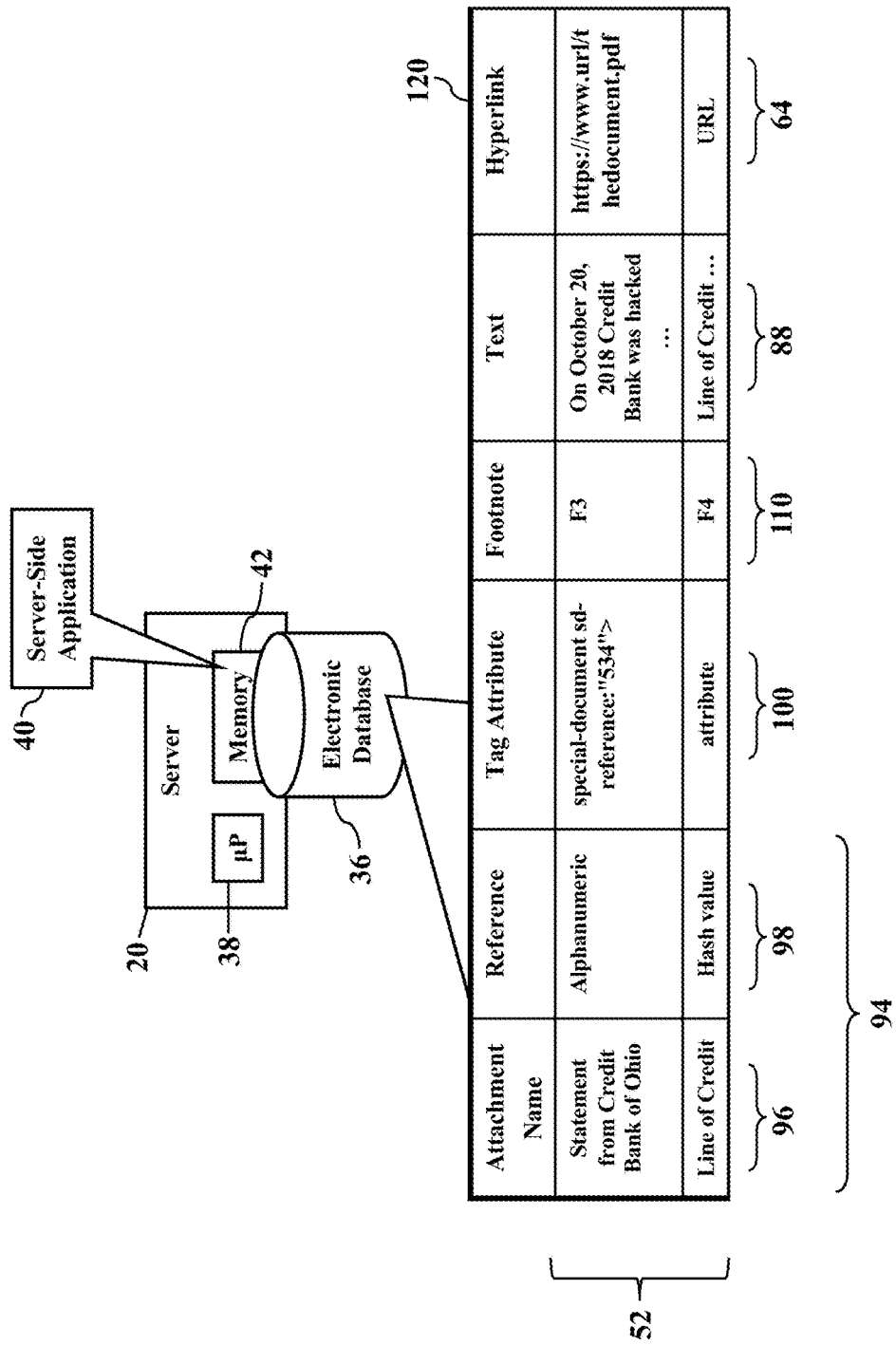

UNSTRUCTURED FOOTNOTES IN ELECTRONIC MORTGAGE DOCUMENTS

CROSS-REFERENCE TO RELATED APPLICATION

This application claims domestic benefit of U.S. Provisional Application No. 62/771,620 filed Nov. 27, 2018 and incorporated herein by reference in its entirety.

BACKGROUND

Standardization of processes and data is one of the benefits that users gain from business application software. Data is structured and as such put into databases and other structured storage, from where it can be retrieved easily and which allows for methodically analyzing it. Often such data will be used to populate forms which themselves represent data in a structured manner.

An example of such a form would be a financial assessment of a mortgage applicant.

While most data is available in a measurable and often numeric value, there may be additional explanatory information that might be relevant for a credit decision (in the case of a mortgage application). For instance, a drop in the FICO score might have an explanation, such as a medical incident or fraud committed by a third party. Additionally, there might be supporting documentation. While some of these cases can be anticipated, and built into the system and into the forms that are used to collect and report the information, there will always be the occasional request that unformatted context needs to be collected and stored. Often such information then has to populate well-defined paper forms, that don't have space for explanations in the particular locations of the form, where such explanations would be most helpful.

Current systems do not allow to systematically handle such situations. This is particularly the case when data is electronically stored in structured storage, such as databases and then such data is reproduced into well defined forms. State of the art is to allow for a general comment that handles the whole data-set or form.

BRIEF DESCRIPTION OF THE SEVERAL VIEWS OF THE DRAWINGS

The features, aspects, and advantages of the exemplary embodiments are understood when the following Detailed Description is read with reference to the accompanying drawings, wherein:

FIGS. 2-5 are examples of a graphical user interface, according to exemplary embodiments; and FIG. 6 illustrates an electronic database, according to exemplary embodiments.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
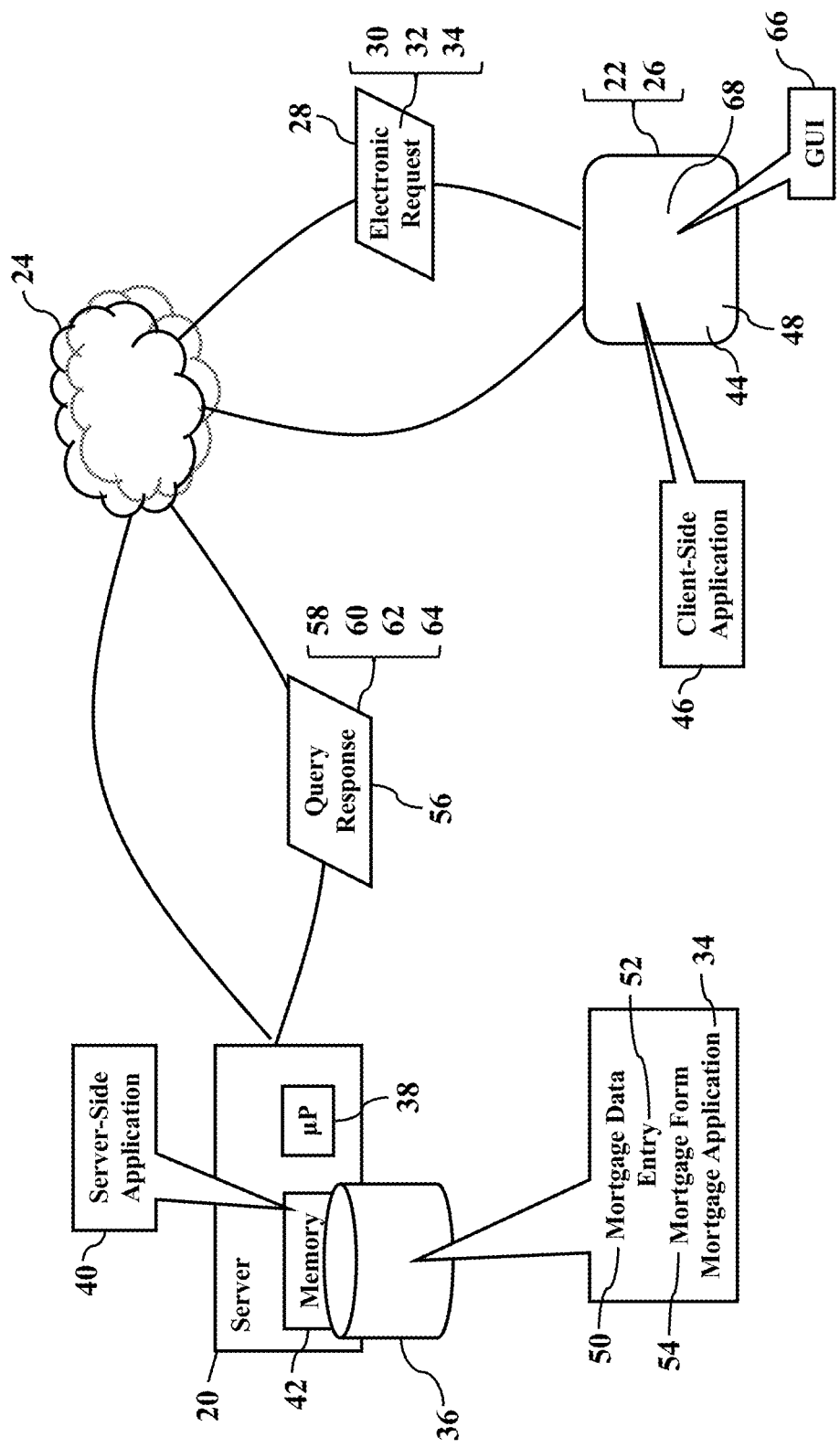
FIG. 1 is a simplified illustration of an operating environment, according to exemplary embodiments.

FIG. 1 is a simplified illustration of an operating environment, according to exemplary embodiments. A server 20 communicates with a client device 22 via a communications network 24. FIG. 1 illustrates the client device 22 as a mobile tablet computer 26, which most readers are thought familiar. The client device 22, however, may be a server, mobile smartphone, computer, or any other processor-controlled device, as later paragraphs will explain. Regardless, the client device 22 sends an electronic request 28 via the communications network 24 to a network address (e.g., Internet protocol address) associated with the server 20. The electronic request 28 requests an electronic document 30 and specifies a query parameter 32. While the electronic document 30 may represent or contain any information or data, most readers are also thought familiar with an electronic mortgage application 34. That is, the electronic request 28 may request electronic data, database entries, forms, and/or documents that are related to the electronic mortgage application 34. A user may thus instruct or cause the mobile tablet computer 26 to send the electronic request 28 specifying the query parameter 32. When the server 20 receives the electronic request 28, the server 20 queries an electronic database 36 for the query parameter 32 specified by the electronic request 28.

The server 20 retrieves information stored in the electronic database 36. The server 20 has a processor 38 that executes a server-side application 40 stored in a solid-state memory device 42. The mobile tablet computer 26 has a processor 44 that executes a client-side application 46 stored in a solid-state memory device 48. The server-side application 40 and the client-side application 46 may thus cooperate (perhaps in a client-server relationship) to identify and/or to retrieve electronic mortgage data 50, database entries 52, mortgage forms 54, and/or other information stored in the electronic database 36 that is related to the electronic mortgage application 34. For example, the server-side application 34 instructs or causes the processor 38 to read or inspect the electronic request 28 for the query parameter 32. The server-side application 34 instructs or causes the processor 38 to query the electronic database 36 for the query parameter 32 and identify its corresponding electronic mortgage data 50, database entries 52, mortgage forms 54, and/or other information that is related to the electronic mortgage application 34. The server-side application 34 may then instruct or cause the processor 38 to retrieve any data or information contained within and/or referenced by the electronic database 36. The server-side application 34 may even instruct or cause the processor 38 to assemble or to arrange the electronic mortgage data 50 and/or the database entries 52 as the mortgage forms 54. Regardless, the server 20 sends a query response 56 to the network address (e.g., Internet protocol address) associated with the mobile tablet computer 26.

The mobile tablet computer 26 receives the query response 56. The query response 56 may be sent as one or more packetized messages 58, web pages 60, or short message service (SMS) messages 62. The query response 56 may additionally or alternatively be posted to a social network. Regardless, the query response 56 may contain the electronic mortgage data 50, the database entries 52, and/or the mortgage forms 54 that are related to the query parameter 32 specified by the electronic request 28. The query response 56 may also contain or reference a hyperlink 64 that permits the mobile tablet computer 26 to download data or information identified by the electronic database 36. When the mobile tablet computer 26 receives the query response 56, the client-side application 34 instructs or causes its processor 44 to present the query response 56 to the user. The tablet computer 26, for example, may generate a graphical user interface (or GUI) 66 or display by its display device 68. The graphical user interface 66 incorporates the data or information identified by the electronic database 36 (e.g., the electronic mortgage data 50, the database entries 52, and/or the mortgage forms 54). The tablet computer 26 thus be visually and/or audibly presents the graphical user interface 66 to the user.

The server 20 may thus be a central or network repository. The server 20 may store or maintain the electronic database 36 as a resource for requesting clients (such as the mobile tablet computer 26). The server may store the database entries 52 that map, relate, or associate many conventional and reverse electronic mortgage applications 34, the mortgage forms 54, and/or their corresponding and/or supporting electronic mortgage data 50. The server 20 may thus have hundreds, thousands, or even millions of database entries 52 that map or relate different users to their electronic mortgage applications 34.

Figure 2:
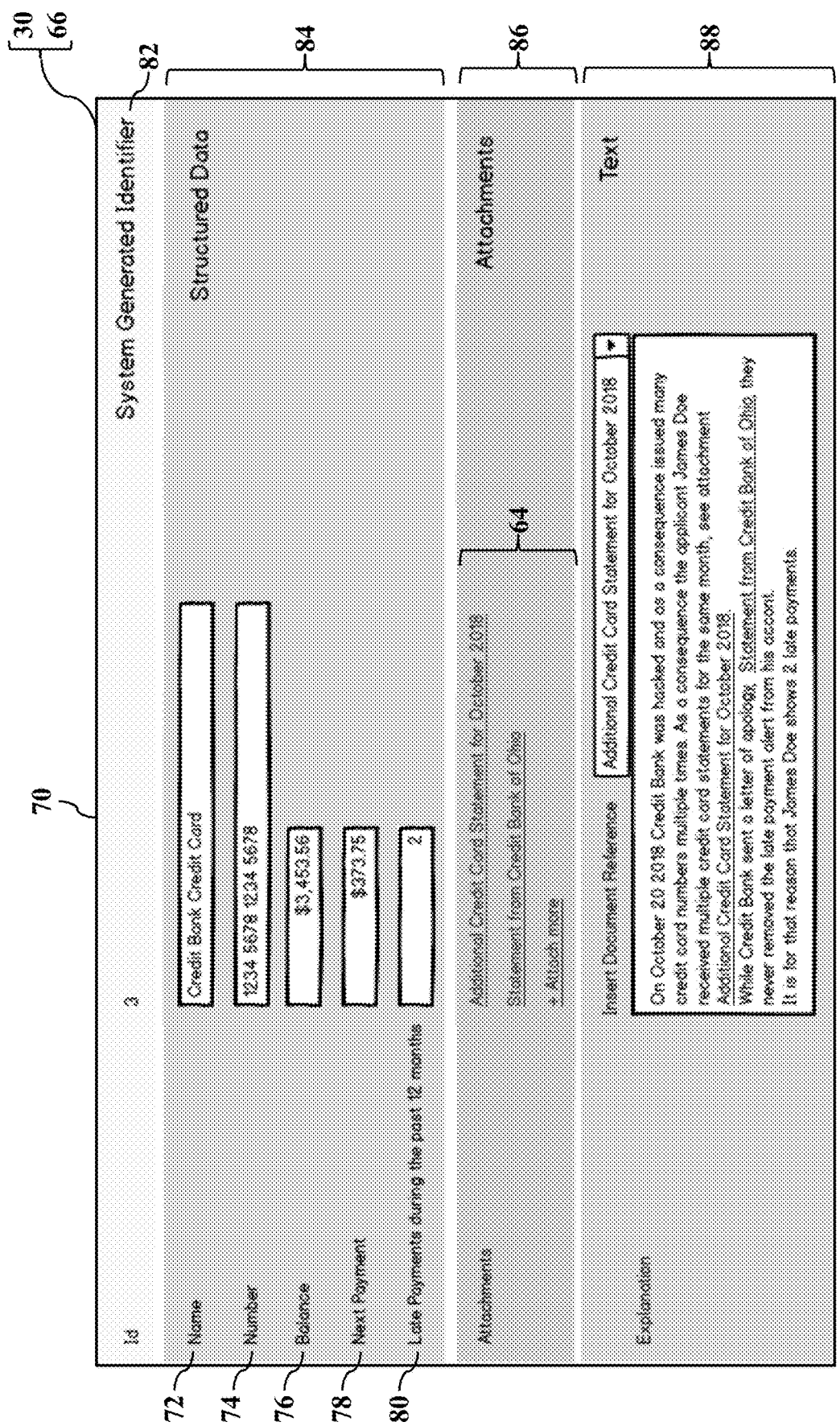

FIG. 2 is an example of the graphical user interface 66, according to exemplary embodiments. The graphical user interface 66 illustrates an electronic mortgage data record 70 that relates to an applicant's electronic mortgage application (illustrated as reference numeral 34 in FIG. 1). The electronic mortgage data record 70 has data fields that visually incorporate their corresponding electronic mortgage data 50 and/or the database entries 52 identified by the electronic database 36 (all illustrated in FIG. 1). The electronic mortgage data record 70 displays a set of current credits, each of them furthermore simply called credit or record (the more technical term) that are the basis for a new credit decision. Each credit consists of structured data such as Name 72, Account Number 74, Balance 76, Next Payment Amount 78, Late Payments 80, and others. To each of these credits there are the standard credit documents such as a written loan agreement, a credit card application and periodic statements. Well-designed systems also anticipate special situations, such as joint credit accounts, stolen credit cards and provide structured ways to handle these. But there can be situations that were not anticipated, such as a credit card issuer issued the same credit card number twice, resulting in lots of explanations and supporting documents.

The electronic mortgage data record 70 may have one or more categories. For example, a System Generated Identifier 82 may be one of the electronic mortgage data 50 and/or the database entries 52 that used to let humans distinguish the different credits in the system that are allocated to a particular case. This does not need to be the same as the record Id that is being used for persistent storage. One or more Structured Data fields 84 present the electronic mortgage data 50 and/or the database entries 52 (retrieved from the electronic database 36 illustrated in FIG. 1) in a structured form, such as the Name 72, Account Number 74, Balance 76, Next Payment Amount 78, Late Payments 80 within a predefined period. This data is entered in well-defined fields that are specific to each entry, such as the balance 76 of the account. This structured approach doesn't leave any room for entering data that doesn't strictly conform to the structure. Attachments 86 are documents that are stored electronically. The graphical user interface 66 presents the attachments 86 as accessed through the hyperlink 64, a graphical control button or any other access scheme. The Attachments 86 themselves can be clearly defined such as a W9. But the Attachments 86 can also be less structured and defined, such as explanatory letters, police reports, pictures. One or more Explanations 88 allow for unstructured explanatory entries. This can be plain text or formatted text such as HTML, allowing to insert hyperlinks to the Attachments 86. A user of the mobile tablet computer 26 may thus place a cursor and manually enter textual commentary into the field representing the Explanations 88.

Figure 3:
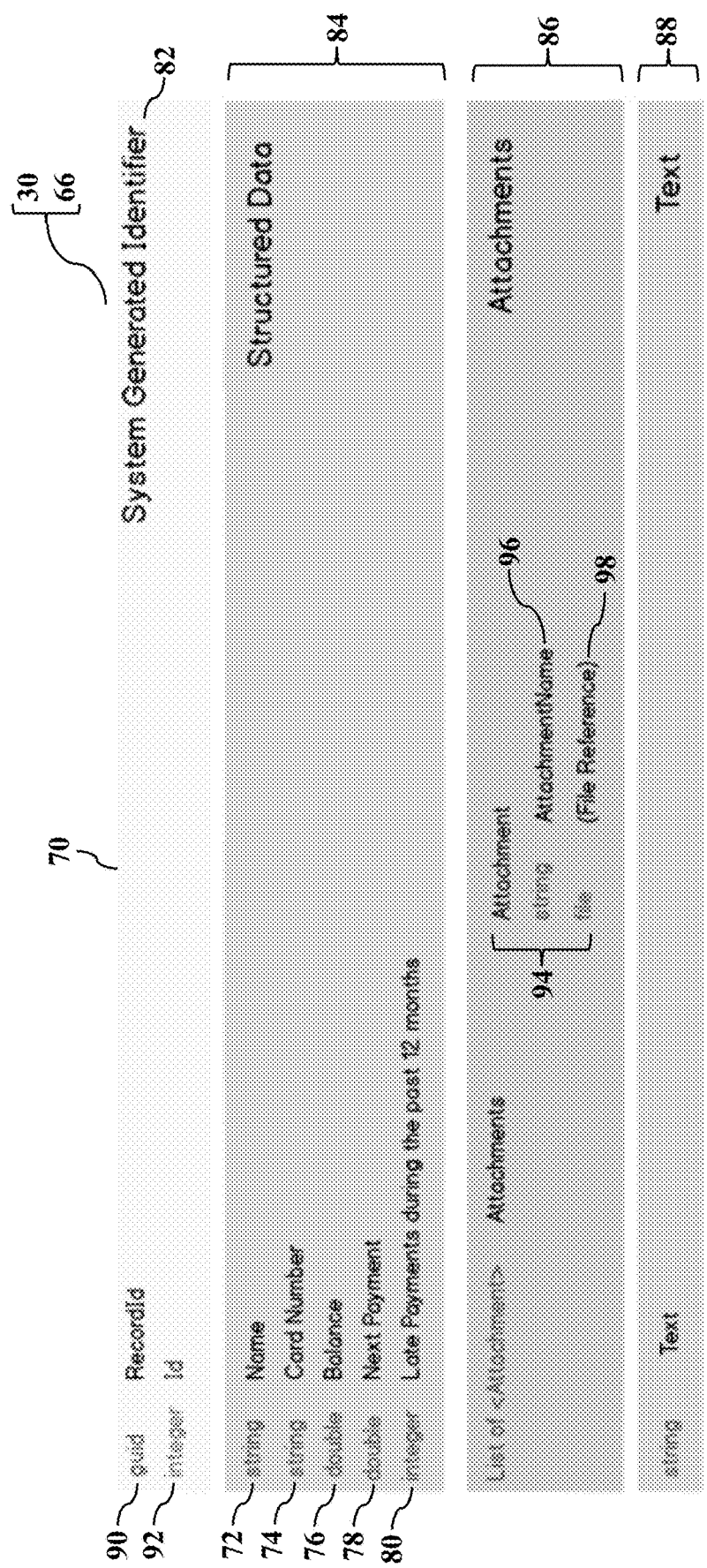
Figure 4:
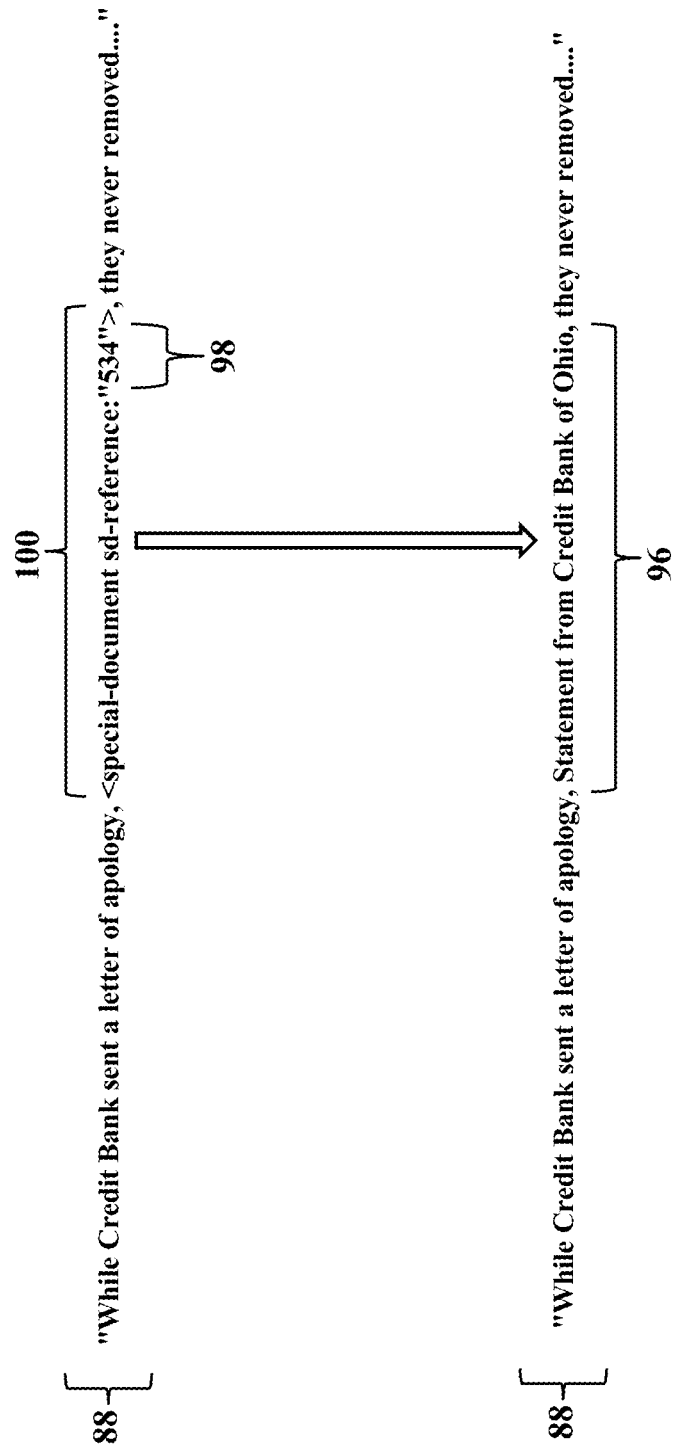

FIGS. 3-4 are more examples of the graphical user interface 66, according to exemplary embodiments. The graphical user interface 66 again illustrates the electronic mortgage data record 70 that relates to an applicant's electronic mortgage application (illustrated as reference numeral 34 in FIG. 1). The graphical user interface 66 generally displays the same categories. A Record Id 90 is any unique identifier used in the electronic database 36 for the electronic mortgage data record 70 and/or an applicant's electronic mortgage application 34. An Id 92 is a system-generated identifier that allows for human identification of the electronic mortgage data record 70 and/or an applicant's electronic mortgage application 34 in a list of presented records. The graphical user interface 66 may also present the Name 72, Account Number 74, Balance 76, Next Payment Amount 78, and Late Payments 80. All these fields should have appropriate types for the data entered.

The Attachments 86 field is also illustrated. While the attachments 86 (such as pdf documents) can be stored directly inside the electronic mortgage data record 70 and/or an applicant's electronic mortgage application 34, best practices rather suggest alternatively storing the Attachments 86 separately, in a file system or other adequate storage and have references to the stored attachments. This alternative is achieved with an attachment class structure 94. The attachment class structure 94 in its simplest form has two properties:

1. AttachmentName 96, a string to store the human understandable name of the file attachment (such as "Statement from Credit Bank of Ohio"); and
2. A file reference 98, which contains a unique identifier to identify the file attachment, often this would also be the file name.

Methods to store and retrieve files based on an identifier or file name are well documented. In the below simple example, the file name is simply and uniquely identified as "534."

The Text 88 is also illustrated. The Text 88 allows a user to enter unstructured textual information. It is advantageous to use a markup language such as hyper-text HTML, which allows for extensions. This example will extend HTML with a tag <special-document> and allow for an attribute "sd-reference" (illustrated as reference numeral 100). The Text 88 effectively stored would then appear as "While Credit Bank sent a letter of apology, <special-document sd-reference:"534">, they never removed . . . ."

The textual number "534" represents the unique file identifier reference 98 of the attachment file 86, allowing the system (such as the server 20 and/or the mobile tablet computer 26) to retrieve the attachment file 86 itself as the attachment class structure 94 and henceforth the AttachmentName 96. The user of server 20 and/or the mobile tablet computer 26 may even access an interface or software tool for changing the AttachmentName 96 (in this case of the attachment 86).

As FIG. 4 illustrates, exemplary embodiments may then modify and/or replace the tag attribute "sd-reference" 100 with the human understandable AttachmentName 96 so it appears as:

"While Credit Bank sent a letter of apology, Statement from Credit Bank of Ohio, they never removed . . . ."

The hyperlinked "Statement from Credit Bank of Ohio" is a uniform resource locator that points to the respective Attachment 86 instance so that a simple user's mouse click or other tactile selection can request, download, and open the attachment document itself and show it in the respective application (such as a pdf viewer). Referencing an attachment Id and retrieving the name of the attachment (AttachmentName 96) when rendering allows for changes in the name of the attachment while keeping the text consistent.

Figure 5:
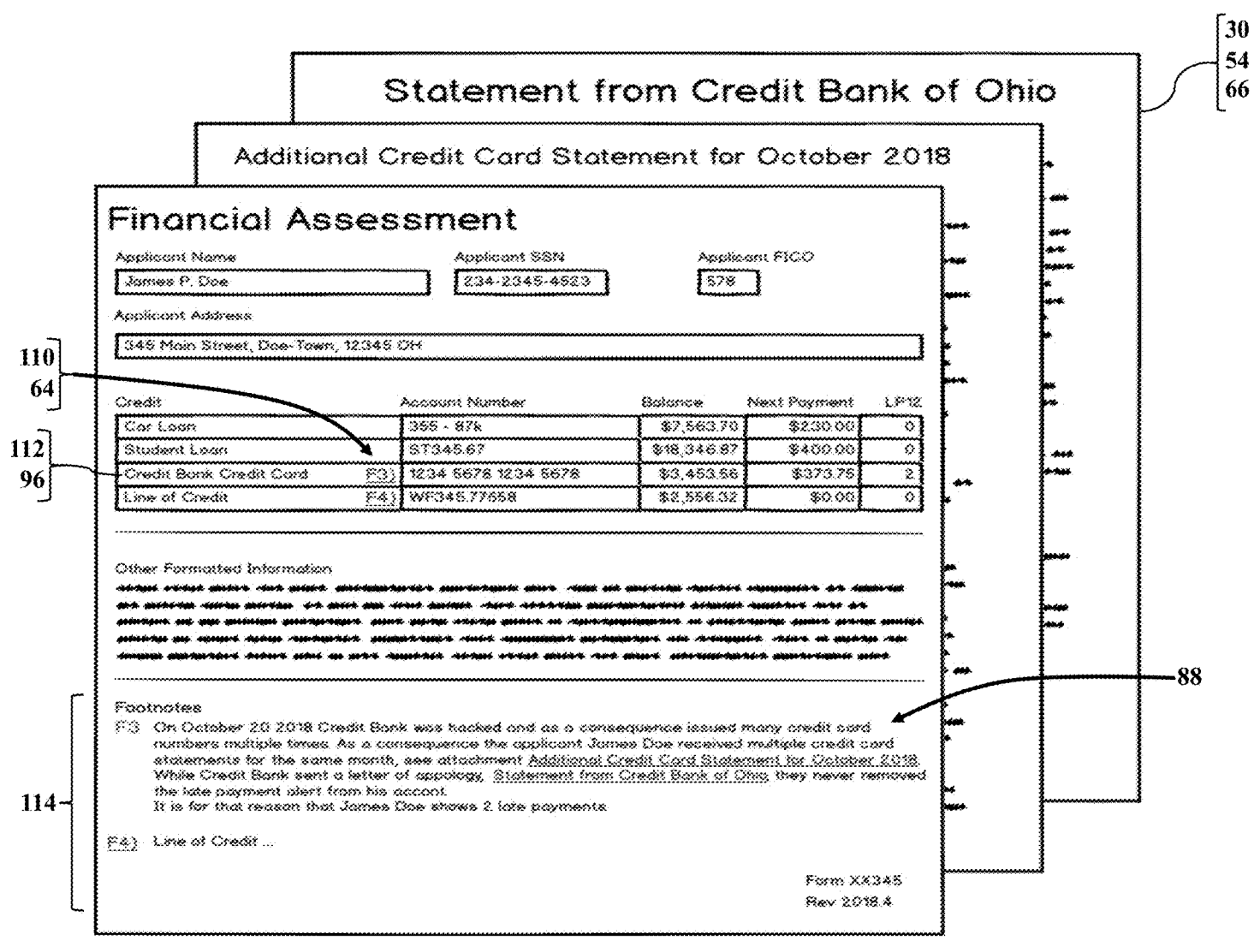

FIG. 5 is another example of the graphical user interface 66, according to exemplary embodiments. The graphical user interface 66 again illustrates the electronic document 30 as multiple mortgage forms 54 that incorporate the electronic mortgage data 50 and/or the database entries 52 identified in the electronic database 36 (illustrated in FIG. 1). The graphical user interface 66 may process and include a footnote 110 as the hyperlink 64 to further informational content. The server (illustrated as reference numeral 20 in FIG. 1) may store, retrieve, and send the electronic mortgage data 50 and/or the database entries 52 (illustrated in FIG. 1) that are used to generate and/or to display the footnote 110. The graphical user interface 66 displays the mortgage forms 54 that arrange or organize the corresponding electronic mortgage data 50 and/or the database entries 52, perhaps according to a structured and non-structured format. Many electronic forms are well-defined and do not allow for non-structured information to be presented. But there is always the possibility to add further information behind the formal part of the form or on a blank additional page.

The footnote 110 ties additional information to the correct entry in the electronic mortgage forms 54. The footnote 110 is a human understandable, electronic reference webpage hyperlink 64. The footnote 110, though, is preferably encoded in a markup language such as HTML that allows inserting the hyperlink 64 inside the electronic mortgage data record 70 where the user wishes to add the unstructured text 88. FIG. 5, for example, illustrates the user inserting the footnote 110 ("F3") as additional commentary for the columnar database entry "Credit Bank Credit Card" (illustrated as reference numeral 112). As the reader may recognize, the "Credit Bank Credit Card" 112 corresponds to the AttachmentName 96 (previously explained with reference to FIGS. 3-4). While the footnote 110 may be added to any location within the electronic mortgage data record 70, the reader likely understands that the footnote 110 is preferably inserted as textual commentary proximate to its corresponding columnar database entry 112. In order to make the footnote 110 hyperlink human readable, the text may include a footnote ID and reference text. In this example the text reads "F3", whereas "F" can stand for Footnote and then the number "3" references the human understandable Id of the record. Thus, the hyperlink 64 may be termed hyperlink F3.

The unstructured text 88 may be added to the end of the electronic mortgage data record 70 representing the mortgage form 54. The graphical user interface 66, the electronic mortgage data record 70, and/or the mortgage form 54 may thus be generated to include a Footnote section 114. There could be multiple footnotes 110 for other records. Records and their corresponding footnotes 110 may be linked through a humanly readable reference index. For example, the footnote "F3" links the third record AttachmentName 96 (e.g., the "Credit Bank Credit Card" 112) to the footnote number 3. Furthermore, there can be a hyperlink embedded through a method called anchor. The link in hyperlink F3 in the record will show up as:

<a onclick="scrolltoFootNote('F3')">F3)</a>

Whereas the footnote 110 at the end of the webpage 60, the electronic mortgage data record 70, and/or the mortgage form 54 will be the anchor which can be encoded as:

<div data-short-id="F3" class="faw-row">
  <div class="faw-cell bolder"><span>F3)</span>
  </div>
  <div class="footnotes"><p>(Footnote Text . . . )</p>
  </div>
</div>

The Attachments 86 may be made available on the server 20. In order to access them from within the footnote 110 (where they are referenced), the Attachments 86 may be embedded in the hyperlink 64. The reference in the original text is then replaced with an updated hyperlink 64:

"While Credit Bank sent a letter of apology, <A href="https://www.url/thedocument.pdf">Statement from Credit Bank of Ohio</A> they never removed . . . "

The hyperlink https://www.url/thedocument.pdf will then point to the URL of the document that is made available on the server 20.

FIG. 6 further illustrates the electronic database 36, according to exemplary embodiments. FIG. 6 illustrates the electronic database 36 as a table 120 that electronically maps, relates, or associates the attachments 86 to their corresponding tag attribute 100, footnote 110, text 88, and/or hyperlink 64. The table 120 may thus have entries arranged as relational columns and rows that map or relate each different footnote 110 to its corresponding constituent or component database information. The electronic database 36 is illustrated as being locally stored in the server 20, but some or all of the electronic database entries 52 may be remotely maintained at some other server or location in the communications network (illustrated as reference numeral 24 in FIG. 1). Although FIG. 6 only illustrates a few entries, in practice the electronic database 36 may contain many entries that richly detail the footnotes 110 inserted into hundreds, thousands, or millions of the electronic mortgage data records 70 for many mortgage applicants. In practice, then, the electronic database 36 may contain many entries that richly detail many electronic mortgage applications 34.

Returning to FIG. 1, the server 20 may send the electronic mortgage form 54 as the query response 56 to the electronic request 26. Once the server 20 determines the attachment 86 and its corresponding tag attribute 100, footnote 110, text 88, and/or hyperlink 64, the server 20 may generate the electronic mortgage form 54. The electronic mortgage form 54 incorporates the footnote 110 and its explanatory text 88. The footnote 110 may further incorporate the hyperlink 64 to permit mousing over or other tactile selection to download and view the attachment 86. The electronic mortgage form 54 may be generated as or formatted as the packetized messages 58, web pages 60, or short message service (SMS) messages 62.

Exemplary embodiments may utilize any processor-controlled device, such as the above-mentioned server 20 and/or tablet computer 26. However, the processor-controlled device may be a tablet computer, tablet, digital watch, digital media player, digital television, or any other device having a processor and solid-state memory device. The processor-controlled device has a network interface to the communications network 24, thus allowing two-way, bidirectional communication with clients, servers, and other network-accessible devices. The server-side application 40 and the client-side application 46 include instructions, code, and/or programs that cause the processor-controlled device to perform operations, such as calling/retrieving any of the electronic mortgage data 50 or entries 52 in the electronic database 26 and generating the mortgage form 54 and/or the electronic mortgage data record 70. The electronic database 36 may further have tabular (e.g., columns and rows) entries that further map or associate any of the Name 72, Account Number 74, Balance 76, Next Payment Amount 78, and Late Payments 80, system generated identifier 82, Record Id 90, and/or Id 92 to their corresponding attachments 86, and to their corresponding tag attribute 100, footnote 110, text 88, and/or hyperlink 64. Any of the entries in the electronic database may be identified and/or retrieved and sent as a packetized message via the communications network to any other device or network address (e.g., Internet protocol address). The processor-controlled device may thus accept or receive queries from clients, and each query specifies a query parameter. If the electronic database contains or references a satisfying or matching entry, any related entries may be identified and send as a query response to the client.

Exemplary embodiments may be applied regardless of networking environment. Exemplary embodiments may be easily adapted to stationary or mobile devices having cellular, wireless fidelity (WI-FI®), near field, and/or BLUETOOTH® capability. Exemplary embodiments may be applied to mobile devices utilizing any portion of the electromagnetic spectrum and any signaling standard (such as the IEEE 802 family of standards, GSM/CDMA/TDMA or any cellular standard, and/or the ISM band). Exemplary embodiments, however, may be applied to any processor-controlled device operating in the radio-frequency domain and/or the Internet Protocol (IP) domain. Exemplary embodiments may be applied to any processor-controlled device utilizing a distributed computing network, such as the Internet (sometimes alternatively known as the "World Wide Web"), an intranet, a local-area network (LAN), and/or a wide-area network (WAN). Exemplary embodiments may be applied to any processor-controlled device utilizing power line technologies, in which signals are communicated via electrical wiring. Indeed, exemplary embodiments may be applied regardless of physical componentry, physical configuration, or communications standard(s).

Exemplary embodiments may utilize any processing component, configuration, or system. Any processor could be multiple processors, which could include distributed processors or parallel processors in a single machine or multiple machines. The processor can be used in supporting a virtual processing environment. The processor could include a state machine, application specific integrated circuit (ASIC), programmable gate array (PGA) including a Field PGA, or state machine. When any of the processors execute instructions to perform "operations," this could include the processor performing the operations directly and/or facilitating, directing, or cooperating with another device or component to perform the operations.

Exemplary embodiments may packetize. When the processor-controlled device communicates via the communications network, the processor-controlled device may collect, send, and retrieve information. The information may be formatted or generated as packets of data according to a packet protocol (such as the Internet Protocol). The packets of data contain bits or bytes of data describing the contents, or payload, of a message. A header of each packet of data may contain routing information identifying an origination address and/or a destination address.

Exemplary embodiments may be physically embodied on or in a computer-readable memory device or other storage medium. This computer-readable medium, for example, may include CD-ROM, DVD, tape, cassette, floppy disk, optical disk, memory card, memory drive, and large-capacity disks. This computer-readable medium, or media, could be distributed to end-subscribers, licensees, and assignees. A computer program product comprises processor-executable instructions for adding footnotes to electronic mortgage documents, as the above paragraphs explained.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

The invention claimed is:

1. A system, comprising:
   a hardware processor; and
   a memory device, the memory device storing instructions, the instructions when executed causing the hardware processor to perform operations, the operations comprising:

receiving a query sent from a client device, the query requesting an electronic mortgage form and specifying a query parameter;

querying an electronic database for the query parameter specified by the query sent from the client device, the electronic database electronically associating attachment class structures to footnotes, to hyperlinks, and to text associated with electronic mortgage forms;

identifying an attachment class structure of the attachment class structures in the electronic database that is electronically associated with the query parameter specified by the query sent from the client device;

identifying a footnote of the footnotes in the electronic database that is electronically associated with the query parameter specified by the query sent from the client device;

identifying a hyperlink of the hyperlinks in the electronic database that is electronically associated with the query parameter specified by the query sent from the client device;

identifying an explanatory text of the text in the electronic database that is electronically associated with the query parameter specified by the query sent from the client device;

identifying a hypertext markup language tag in the explanatory text;

replacing the hypertext markup language tag in the explanatory text with the attachment class structure identified in the electronic database;

generating the electronic mortgage form as a query response to the query sent from the client device, the electronic mortgage form incorporating the explanatory text and the hyperlink into the footnote to download an attachment represented by the attachment class structure; and sending the electronic mortgage form as the query response to the query sent from the client device.

2. The system of claim 1, wherein the operations further comprise retrieving the explanatory text.

3. The system of claim 1, wherein the operations further comprise generating the electronic mortgage form incorporating the explanatory text into the footnote as a textual explanation of the attachment.

4. The system of claim 1, wherein the operations further comprise identifying the attachment.

5. The system of claim 1, wherein the operations further comprise identifying a payment.

6. The system of claim 1, wherein the operations further comprise sending the electronic mortgage form as a short message service message.

7. The system of claim 1, wherein the operations further comprise sending the electronic mortgage form as a message.

8. The system of claim 1, wherein the operations further comprise sending the electronic mortgage form as a web page.

9. A method, comprising:

receiving, by a server, a query sent from a client device, the query requesting an electronic mortgage form and specifying a query parameter;

querying, by the server, an electronic database for the query parameter specified by the query sent from the client device, the electronic database electronically associating attachment class structures to footnotes, to hyperlinks, and to text associated with electronic mortgage forms;

identifying, by the server, an attachment name of the attachment class structures in the electronic database that is electronically associated with the query parameter specified by the query sent from the client device;

identifying, by the server, a footnote of the footnotes in the electronic database that is electronically associated with the query parameter specified by the query sent from the client device;

identifying, by the server, a hyperlink of the hyperlinks in the electronic database that is electronically associated with the query parameter specified by the query sent from the client device;

identifying, by the server, an explanatory text of the text in the electronic database that is electronically associated with the footnote;

identifying, by the server, a hypertext markup language tag in the explanatory text;

replacing, by the server, the hypertext markup language tag in the explanatory text with the attachment name identified in the electronic database;

generating, by the server, the electronic mortgage form as a query response to the query sent from the client device, the electronic mortgage form incorporating the explanatory text and the attachment name into the footnote to download an attachment represented by the hyperlink; and sending, by the server, the electronic mortgage form as the query response to the query sent from the client device.

10. The method of claim 9, further comprising retrieving the explanatory text.

11. The method of claim 9, further comprising generating the electronic mortgage form incorporating the explanatory text into the footnote as a textual explanation of the attachment.

12. The method of claim 9, further comprising identifying the attachment.

13. The method of claim 9, further comprising identifying a payment.

14. The method of claim 9, further comprising sending the electronic mortgage form as a message.

15. The method of claim 9, further comprising sending the electronic mortgage form as a short message service message.

16. The method of claim 9, further comprising sending the electronic mortgage form as a web page.

17. A memory device storing instructions that when executed cause a hardware processor to perform operations, the operations comprising:

receiving a query sent from a client device, the query requesting an electronic mortgage form and specifying a query parameter;

querying an electronic database for the query parameter specified by the query sent from the client device, the electronic database electronically associating attachment class structures to footnotes, to hyperlinks, and to text associated with electronic mortgage forms;

identifying an attachment name of the attachment class structures in the electronic database that is electronically associated with the query parameter specified by the query sent from the client device;

identifying a footnote of the footnotes in the electronic database that is electronically associated with the query parameter specified by the query sent from the client device;

identifying a hyperlink of the hyperlinks in the electronic database that is electronically associated with the query parameter specified by the query sent from the client device;

identifying an explanatory text of the text in the electronic database that is electronically associated with the footnote;

identifying a hypertext markup language tag in the explanatory text;

replacing the hypertext markup language tag in the explanatory text with the attachment name identified in the electronic database;

generating the electronic mortgage form as a query response to the query sent from the client device, the electronic mortgage form incorporating the explanatory text and the attachment name into the footnote to download an attachment represented by the hyperlink; and sending the electronic mortgage form as the query response to the query sent from the client device.

18. The memory device of claim 17, wherein the operations further comprise retrieving the explanatory text.

19. The memory device of claim 17, wherein the operations further comprise sending the electronic mortgage form as a message.

20. The memory device of claim 17, wherein the operations further comprise sending the electronic mortgage form as a web page.

* * * * *